United States Patent Office 3,031,605
Patented Apr. 24, 1962

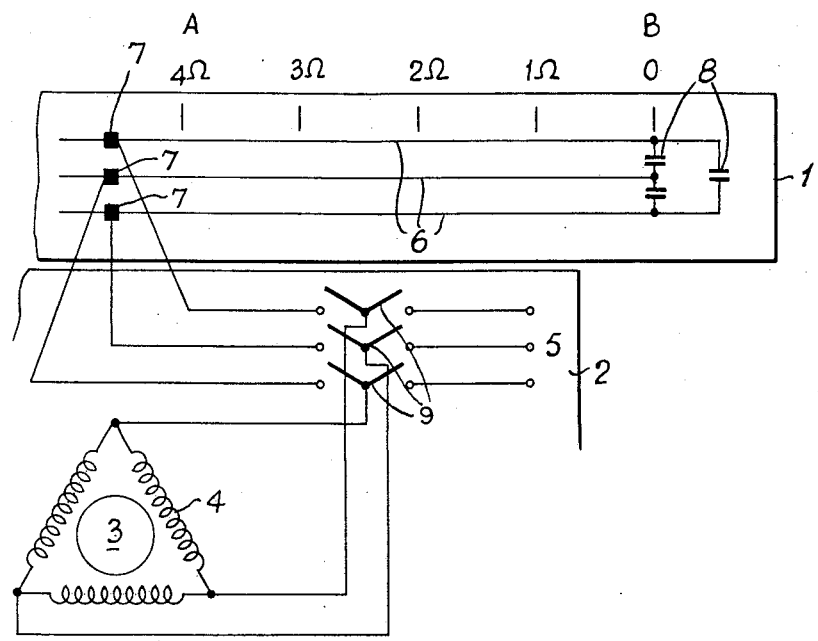

3,031,605
DYNAMIC BRAKING FOR INDUCTION MOTORS
John Whitcroft, Lilbourne, Rugby, and Shafi-Uddin Ahmed Choudhury, Rugby, England, assignors to Associated Electrical Industries Limited, London, England, a company of Great Britain
Filed Feb. 3, 1960, Ser. No. 6,430
Claims priority, application Great Britain Feb. 16, 1959
4 Claims. (Cl. 318—211)

This invention relates to a means for effecting braking of an induction motor, particularly when it is desirable for the load driven by the motor to come to rest at a predetermined position.

In certain applications, such as for machine tools where the position of the movable portion of the machine tool driven by the motor is to be arrested at a given position, it is desirable for the motor to be braked electrically to a low crawling speed whereupon it can then be stopped accurately at a desired position. It is known to effect braking of the induction motor by disconnecting the primary winding from the alternating current supply and connecting a capacitor, or capacitors, across the primary winding so that the continued rotation of the rotor under the influence of the inertia of the load driven by the motor produces self-excitation of the motor with the result of dynamic braking effect thereon. The distance which the load travels after the supply has been disconnected from the motor and dynamic braking has been initiated, depends on the inertia of the load as well as the speed at which the load is being driven prior to the initiation of dynamic braking. If, therefore, the load on the motor is liable to variation while the distance moved by the load after the initiation of braking is to remain constant, difficulties arise in adjusting the system to deal with the several conditions encountered.

According to the invention, the braking effect on an induction motor to which dynamic braking is applied by disconnecting the alternating current supply to the primary winding and simultaneously with or thereafter connecting a capacitor across one phase, or across each of two or more phases, of the primary winding is progressively increased as the load driven by the induction motor approaches the desired stopping place by diminishing impedance in series or increasing impedance in shunt with the, or each, capacitor.

The effect of the impedance in series or shunt with the capacitor is to vary the value of the self-excitation currents induced in the primary winding by the continued rotation of the rotor and thereby to vary the braking torque on the rotor.

Impedance conveniently consists of resistance in series or shunt with the capacitor, or each capacitor, the resistance in series with the capacitor being progressively diminished, or the resistance in shunt with the capacitor being progressively increased, as the load approaches the desired stopping point.

In the application of the invention to the control of an induction motor driving the movable portion of a machine tool, we preferably arrange for the movable portion of the tool which is driven by the motor to be provided with brush gear co-operating with resistive conductors supported on the bed of the machine tool, the conductors being arranged to connect a capacitance across one phase, or capacitance across two or more phases of the primary winding of the induction motor after the supply has been disconnected therefrom and the brushes in moving along the resistive conductors progressively diminishing the resistance in series with the or each capacitance as the moving portion of the machine tool approaches the desired stopping place. It is preferable for the value of the capacitor(s) to be such as to provide capacitive reactance comparable with the short-circuit reactance of the induction motor. The capacitor(s) thus have a value some ten to twenty times that required were the capacitor used for power factor correction.

The invention will be more readily understood on consideration of the following description of the accompanying diagrammatic drawing which shows its application to the control of an induction motor driving a movable portion of a machine tool.

Referring to the drawing, the bed of the machine tool is indicated at 1 and the movable portion at 2. The movable portion may represent the tool slide and is indicated as being driven along the bed by means of an induction motor 3, the rotor of which is suitably arranged to drive the tool slide through appropriate gearing. The motor is shown having a delta connected primary winding 4 normally connected through switching means to a source of three-phase supply indicated at 5.

The normal zone in which braking of the slide is to be effected is indicated as being from A to B. In this zone are mounted on the bed 1 three resistive conductors 6 connectible to the primary winding 4 by way of brushes 7 and connected at the B end of the zone to dynamic braking capacitors 8. The resistance of the conductors is indicated by the ohmic values represented by the appropriate symbols, the resistance being illustrated as progressively reducing from four ohms to zero as the conductors progress from A to B in the braking zone.

When braking is desired, the primary winding 4 is disconnected from the supply 5 and is connected to the conductors leading to brushes 7 by way of the switching means shown as a contactor 9. As the slide 2 progressively moves from A to B the resistance in series with the dynamic braking capacitors 8 progressively diminishes with the result that the braking effect of the capacitors due to self-excitation of the motor progressively increases, assuming the speed to remain constant. As, however, the speed diminishes braking effect also diminishes, but is maintained at a higher value than would otherwise apply by the progressive diminution in the value of the resistance in series with the capacitors 8.

While the invention has been described as being particularly applicable to a system in which the load may vary, it may also be applied to a system in which the load is relatively constant, but in which the position within the braking zone at which braking is initiated is liable to vary. Thus, referring to the diagram it is evident that if braking is initiated as the load approaches position A the braking effect is low since the resistance in series with the capacitors 8 is high. If, however, the load has entered the zone and is positioned at some point between A and B before dynamic braking is initiated, the effect of the capacitors is greater owing to the diminished value of the resistance in series therewith and the braking torque would consequently be higher.

What we claim is:

1. In electrical control apparatus, an induction motor having a rotor and a stator, primary and secondary windings on said stator and rotor, a load, means drivingly connecting said load to said rotor, a source of electric current supply for said primary winding, a capacitor, impedance means connected to said capacitor, switching means for alternatively connecting said source and said impedance to said primary winding, and means controlling the value of said impedance when said primary winding has been disconnected from said source by said switching means and connected to said impedance so as progressively to increase the current flowing into said capacitor as said load approaches a desired stopping place and produce a progressively increasing braking effect on said load.

2. In a machine tool having a bed and a slide movable along said bed, an induction motor having a stator and a rotor respectively carrying primary and secondary windings, said rotor having a driving connection with said slide, a source of alternating current supply for said primary winding, a capacitor, impedance means connected to said capacitor and located adjacent to the path of movement of said slide, brush gear cooperating with said impedance means, said brush gear and said impedance means being relatively movable in dependence on the relative positions of said bed and said slide, and switching means for alternately connecting said brush gear and said source to said primary winding, said brush gear and said impedance means cooperating progressively to increase the self-excitation current flowing into said capacitor as said slide approaches a desired stopping place with said switching means connecting said primary winding to said brush gear.

3. In a machine tool having a bed and a slide movable along said bed, an induction motor having a stator and a rotor respectively carrying a polyphase primary and a secondary winding, said rotor having a driving connection with said slide, a source of polyphase alternating current supply for said primary winding, a plurality of capacitors, resistances connected to each of said capacitors and located adjacent the path of movement of said slide, brush gear cooperating with said resistances, said brush gear and said resistance means being relatively movable in dependence on the relative positions of said bed and said slide, and switching means for alternately connecting said brush gear and said source to said primary winding, said brush gear and said resistances cooperating progressively to increase the self-excitation current flowing into said capacitors from said primary winding as said slide approaches a desired stopping place with said switching means connecting said primary winding to said brush gear.

4. An arrangement as claimed in claim 3, in which the capacitors have a value such as to provide capacitive reactance comparable with the short-circuit reactance of the motor.

References Cited in the file of this patent
UNITED STATES PATENTS

| | | |
|---|---|---|
| 1,754,779 | Thurston | Apr. 15, 1930 |
| 2,445,430 | Herchenroeder et al. | July 20, 1948 |